US006304546B1

(12) United States Patent
Natarajan et al.

(10) Patent No.: US 6,304,546 B1
(45) Date of Patent: Oct. 16, 2001

(54) END-TO-END BIDIRECTIONAL KEEP-ALIVE USING VIRTUAL CIRCUITS

(75) Inventors: Shankar Natarajan, Fremont; Gregory A. Fowler, Mountain View, both of CA (US)

(73) Assignee: Cisco Technology, Inc.

( * ) Notice: Subject to any disclaimer, the term of this patent is extended or adjusted under 35 U.S.C. 154(b) by 0 days.

(21) Appl. No.: 08/769,305

(22) Filed: Dec. 19, 1996

(51) Int. Cl.$^7$ .................................. H04J 3/14; H04L 5/14
(52) U.S. Cl. .................... 370/216; 370/231; 370/236; 370/409; 714/2
(58) Field of Search .................... 370/216, 217, 370/218, 229, 230, 231, 235, 236, 242, 244, 284, 389, 394, 395, 396, 397, 400, 409, 410; 709/220, 221, 234, 235; 714/1, 2, 3, 4

(56) References Cited

U.S. PATENT DOCUMENTS

| Re. 33,900 | 4/1992 | Howson ............................. 370/105 |
| 4,131,767 | 12/1978 | Weinstein ........................... 179/170.2 |

(List continued on next page.)

FOREIGN PATENT DOCUMENTS

| 0 384 758 | 2/1990 | (EP) ............................. H04L/12/56 |
| 0 431 751 A1 | 11/1990 | (EP) . |
| 0 567 217 A2 | 10/1993 | (EP) ............................. H04L/12/46 |
| WO 93/07569 | 4/1993 | (WO) ............................ G06F/13/40 |
| WO 93/07692 | 4/1993 | (WO) .............................. H04J/3/24 |
| WO 94/01828 | 1/1994 | (WO) ............................ G06F/13/40 |
| WO 95/20850 | 8/1995 | (WO) ............................ H04L/12/56 |

OTHER PUBLICATIONS

Esaki, et al., "Datagram Delivery in an ATM–Internet," IEICE Transactions on Communications vol. E77–B, No. 3, (1994) Mar., Tokyo, Japan.
Doeringer, et al., "Routing on Longest–Matching Prefixes," IEEE Transactions on Networking, vol. 4, No. 1, Feb. 1996, pp. 86–97.

(List continued on next page.)

Primary Examiner—Alpus H. Hsu
(74) Attorney, Agent, or Firm—Beyer Weaver & Thomas, LLP (57) ABSTRACT

The invention provides a method and system for sending and receiving end-to-end bidirectional keep-alive messages using virtual circuits. Nodes coupled to a network, such as a frame relay network, periodically exchange link-layer "keep-alive" messages which indicate information regarding configuration and status of the virtual circuit, as well as information regarding congestion at sending nodes. Nodes respond to received keep-alive messages, or to timed-out failure to receive keep-alive messages, with follow-on actions, such as attempting to reconnect when a virtual circuit fails. Keep-alive messages may be propagated across multiple networks of either similar or different architecture. Keep-alive messages include sent and received sequence numbers, thus providing receiving nodes with a technique for determining if any keep-alive messages have been lost. Keep-alive messages can also include information regarding configuration of the virtual circuit, status of the virtual circuit (including counts of recent keep-alive message failure or success), and congestion at the sending node.

31 Claims, 3 Drawing Sheets

U.S. PATENT DOCUMENTS

| | | | |
|---|---|---|---|
| 4,161,719 | 7/1979 | Parikh et al. | 340/147 SY |
| 4,316,284 | 2/1982 | Howson | 370/105 |
| 4,397,020 | 8/1983 | Howson | 370/105 |
| 4,419,728 | 12/1983 | Larson | 364/200 |
| 4,424,565 | 1/1984 | Larson | 364/200 |
| 4,437,087 | 3/1984 | Petr | 340/347 DD |
| 4,438,511 | 3/1984 | Baran | 370/19 |
| 4,439,763 | 3/1984 | Limb | 340/825.5 |
| 4,445,213 | 4/1984 | Baugh et al. | 370/94 |
| 4,446,555 | 5/1984 | Devault et al. | 370/94 |
| 4,456,957 | 6/1984 | Schieltz | 364/200 |
| 4,464,658 | 8/1984 | Thelen | 340/825.5 |
| 4,499,576 | 2/1985 | Fraser | 370/60 |
| 4,506,358 | 3/1985 | Montgomery | 370/60 |
| 4,507,760 | 3/1985 | Fraser | 365/221 |
| 4,532,626 | 7/1985 | Flores et al. | 370/85 |
| 4,644,532 | 2/1987 | George et al. | 370/94 |
| 4,646,287 | 2/1987 | Larson et al. | 370/60 |
| 4,677,423 | 6/1987 | Benvenuto et al. | 340/347 DD |
| 4,679,227 | 7/1987 | Hughes-Hartogs | 379/98 |
| 4,723,267 | 2/1988 | Jones et al. | 379/93 |
| 4,731,816 | 3/1988 | Hughes-Hartogs | 379/98 |
| 4,750,136 | 6/1988 | Arpin et al. | 364/514 |
| 4,757,495 | 7/1988 | Decker et al. | 370/76 |
| 4,763,194 | 8/1988 | Gordon et al. | 358/86 |
| 4,769,810 | 9/1988 | Eckberg, Jr. et al. | 370/60 |
| 4,769,811 | 9/1988 | Eckberg, Jr. et al. | 370/60 |
| 4,771,425 | 9/1988 | Baran et al. | 370/85 |
| 4,819,228 | 4/1989 | Baran et al. | 370/85 |
| 4,827,411 | 5/1989 | Arrowood et al. | 707/206 |
| 4,833,706 | 5/1989 | Hughes-Hartogs | 379/98 |
| 4,835,737 | 5/1989 | Herrig et al. | 364/900 |
| 4,879,551 | 11/1989 | Georgiou et al. | 340/825.87 |
| 4,893,306 | 1/1990 | Chao et al. | 340/94.2 |
| 4,903,261 | 2/1990 | Baran et al. | 370/60 |
| 4,922,486 | 5/1990 | Lidinsky et al. | 370/60 |
| 4,933,937 | 6/1990 | Konishi | 370/85.13 |
| 4,960,310 | 10/1990 | Cushing | 350/1.7 |
| 4,962,497 | 10/1990 | Ferenc et al. | 370/60.1 |
| 4,962,532 | 10/1990 | Kasiraj et al. | 380/25 |
| 4,965,772 | 10/1990 | Daniel et al. | 364/920 |
| 4,970,678 | 11/1990 | Sladowski et al. | 364/900 |
| 4,980,897 | 12/1990 | Decker et al. | 375/38 |
| 4,991,169 | 2/1991 | Davis et al. | 370/77 |
| 5,003,595 | 3/1991 | Collins et al. | 380/25 |
| 5,014,265 | 5/1991 | Hahne et al. | 370/60 |
| 5,020,058 | 5/1991 | Holden et al. | 370/109 |
| 5,033,076 | 7/1991 | Jones et al. | 379/67 |
| 5,054,034 | 10/1991 | Hughes-Hartogs | 375/8 |
| 5,059,925 | 10/1991 | Weisbloom | 331/1 A |
| 5,072,449 | 12/1991 | Enns et al. | 371/37.1 |
| 5,088,032 | 2/1992 | Bosack | 395/200 |
| 5,115,431 | 5/1992 | Williams et al. | 370/94.1 |
| 5,128,945 | 7/1992 | Enns et al. | 371/37.1 |
| 5,136,580 | 8/1992 | Videlock et al. | 370/60 |
| 5,166,930 | 11/1992 | Braff et al. | 370/94.1 |
| 5,199,049 | 3/1993 | Wilson | 375/104 |
| 5,206,886 | 4/1993 | Bingham | 375/97 |
| 5,208,811 * | 5/1993 | Kashio et al. | 370/401 |
| 5,212,686 | 5/1993 | Joy et al. | 370/60 |
| 5,224,099 | 6/1993 | Corbalis et al. | 370/94.2 |
| 5,226,120 | 7/1993 | Brown et al. | 395/200 |
| 5,228,062 | 7/1993 | Bingham | 375/97 |
| 5,229,994 | 7/1993 | Balzano et al. | 370/85.13 |
| 5,237,564 | 8/1993 | Lespagnol et al. | 370/60.1 |
| 5,241,682 | 8/1993 | Bryant et al. | 395/800 |
| 5,243,342 | 9/1993 | Kattemalalavadi et al. | 341/106 |
| 5,243,596 | 9/1993 | Port et al. | 370/94.1 |
| 5,247,516 | 9/1993 | Bernstein et al. | 370/468 |
| 5,249,178 | 9/1993 | Kurano et al. | 370/60 |
| 5,253,251 | 10/1993 | Aramaki . | |
| 5,255,291 | 10/1993 | Holden et al. | 375/111 |
| 5,260,933 | 11/1993 | Rouse | 370/14 |
| 5,260,978 | 11/1993 | Fleischer et al. | 375/106 |
| 5,268,592 | 12/1993 | Bellamy et al. | 307/43 |
| 5,268,900 | 12/1993 | Hluchyj et al. | 370/94.1 |
| 5,271,004 | 12/1993 | Proctor et al. | 370/60 |
| 5,274,631 | 12/1993 | Bhardwaj | 370/60 |
| 5,274,635 | 12/1993 | Rahman et al. | 370/60.1 |
| 5,274,643 | 12/1993 | Fisk | 370/94.1 |
| 5,280,470 | 1/1994 | Buhrke et al. | 370/13 |
| 5,280,480 | 1/1994 | Pitt et al. | 370/85.13 |
| 5,280,500 | 1/1994 | Mazzola et al. | 375/17 |
| 5,283,783 | 2/1994 | Nguyen et al. | 370/16.1 |
| 5,287,103 | 2/1994 | Kasprzyk et al. | 340/825.52 |
| 5,291,482 | 3/1994 | McHarg et al. | 370/60 |
| 5,305,311 | 4/1994 | Lyles | 370/60 |
| 5,307,343 | 4/1994 | Bostica et al. | 370/60 |
| 5,311,509 | 5/1994 | Heddes et al. | 370/60 |
| 5,313,454 | 5/1994 | Bustini et al. | 370/13 |
| 5,313,582 | 5/1994 | Hendel et al. | 395/250 |
| 5,317,562 | 5/1994 | Nardin et al. | 370/16 |
| 5,319,644 | 6/1994 | Liang | 370/85.5 |
| 5,327,421 | 7/1994 | Hiller et al. | 370/60.1 |
| 5,331,637 | 7/1994 | Francis et al. | 370/54 |
| 5,345,445 | 9/1994 | Hiller et al. | 370/60.1 |
| 5,345,446 | 9/1994 | Hiller et al. | 370/60.1 |
| 5,359,592 | 10/1994 | Corbalis et al. | 370/17 |
| 5,361,250 | 11/1994 | Nguyen et al. | 370/16.1 |
| 5,361,256 | 11/1994 | Doeringer et al. | 370/60 |
| 5,361,259 | 11/1994 | Hunt et al. | 370/84 |
| 5,365,524 | 11/1994 | Hiller et al. | 370/94.2 |
| 5,367,517 | 11/1994 | Cidon et al. | 370/431 |
| 5,371,852 | 12/1994 | Attanasio et al. | 395/200 |
| 5,386,567 | 1/1995 | Lien et al. | 395/700 |
| 5,390,170 | 2/1995 | Sawant et al. | 370/58.1 |
| 5,390,175 | 2/1995 | Hiller et al. | 370/60 |
| 5,394,394 | 2/1995 | Crowther et al. | 370/60 |
| 5,394,402 | 2/1995 | Ross | 370/94.1 |
| 5,400,325 | 3/1995 | Chatwani et al. | 370/60.1 |
| 5,408,469 | 4/1995 | Opher et al. | 370/60.1 |
| 5,416,842 | 5/1995 | Aziz | 380/30 |
| 5,422,880 | 6/1995 | Heitkamp et al. | 370/60 |
| 5,422,882 | 6/1995 | Hiller et al. | 370/60.1 |
| 5,423,002 | 6/1995 | Hart | 395/200 |
| 5,426,636 | 6/1995 | Hiller et al. | 370/60.1 |
| 5,428,607 | 6/1995 | Hiller et al. | 370/60.1 |
| 5,430,715 | 7/1995 | Corbalis et al. | 370/54 |
| 5,442,457 | 8/1995 | Najafi | 358/400 |
| 5,442,630 | 8/1995 | Gagliardi et al. | 370/85.13 |
| 5,452,297 | 9/1995 | Hiller et al. | 370/60.1 |
| 5,473,599 | 12/1995 | Li et al. | 370/16 |
| 5,473,607 | 12/1995 | Hausman et al. | 370/85.13 |
| 5,477,541 * | 12/1995 | White et al. | 370/94.1 |
| 5,485,455 | 1/1996 | Dobbins et al. | 370/255 |
| 5,490,140 * | 2/1996 | Abensour et al. | 370/60.1 |
| 5,491,687 | 2/1996 | Christensen et al. | 370/17 |
| 5,491,804 | 2/1996 | Heath et al. | 395/275 |
| 5,497,368 | 3/1996 | Beijnierse et al. . | |
| 5,504,747 | 4/1996 | Sweazey . | |
| 5,509,006 | 4/1996 | Wilford et al. | 370/60 |
| 5,517,494 | 5/1996 | Green . | |
| 5,519,704 | 5/1996 | Farinacci et al. | 370/85.13 |
| 5,526,489 | 6/1996 | Nilakantan et al. | 395/200.02 |
| 5,530,963 | 6/1996 | Moore et al. | 395/200.15 |
| 5,535,195 | 7/1996 | Lee | 370/54 |
| 5,539,734 * | 7/1996 | Burwell et al. | 370/60 |
| 5,555,244 | 9/1996 | Gupta et al. | 370/397 |
| 5,561,669 | 10/1996 | Lenney et al. | 370/60.1 |
| 5,583,862 | 12/1996 | Callon | 370/397 |
| 5,592,470 | 1/1997 | Rudrapatna et al. | 370/320 |

| | | | |
|---|---|---|---|
| 5,598,581 | | 1/1997 | Daines et al. .................. 395/872 |
| 5,600,798 | * | 2/1997 | Cherukuri et al. ............ 395/200.13 |
| 5,604,868 | | 2/1997 | Komine et al. ............... 395/200.68 |
| 5,608,726 | | 3/1997 | Virgile . |
| 5,617,417 | | 4/1997 | Sathe et al. .................. 370/394 |
| 5,617,421 | | 4/1997 | Chin et al. .................... 370/402 |
| 5,631,908 | | 5/1997 | Saxe . |
| 5,632,021 | | 5/1997 | Jennings et al. ............... 395/309 |
| 5,634,010 | | 5/1997 | Ciscon et al. ............... 395/200.53 |
| 5,638,359 | * | 6/1997 | Peltola et al. ................. 370/229 |
| 5,644,718 | | 7/1997 | Belove et al. ............... 395/200.57 |
| 5,659,684 | * | 8/1997 | Giovannoni et al. ............ 370/465 |
| 5,666,353 | | 9/1997 | Klausmeier et al. ............. 370/230 |
| 5,673,265 | | 9/1997 | Gupta et al. ................... 370/432 |
| 5,678,006 | | 10/1997 | Valizadeh et al. ............ 395/200.53 |
| 5,684,797 | | 11/1997 | Aznar et al. ................... 370/390 |
| 5,687,324 | | 11/1997 | Green et al. . |
| 5,689,506 | | 11/1997 | Chiussi et al. ................. 370/388 |
| 5,694,390 | * | 12/1997 | Yamato et al. ................. 370/230 |
| 5,724,351 | | 3/1998 | Chao et al. . |
| 5,748,617 | * | 5/1998 | McLain, Jr. .................. 370/244 |
| 5,754,547 | | 5/1998 | Nakazawa . |
| 5,835,710 | * | 11/1998 | Nagami et al. ................ 395/200.8 |
| 5,854,903 | | 12/1998 | Morrison et al. . |
| 5,898,686 | | 4/1999 | Virgile . |

OTHER PUBLICATIONS

Allen, M., "Novell IPX Over Various WAN Media (IPXWAN)," Network Working Group, RFC 1551, Dec. 1993, pp. 1–22.

Becker, D., "3c589.c: A 3c589 EtherLink3 ethernet driver for linux." becker@CESDIS.gsfc. nasa.gov, May 3, 1994, pp. 1–13.

Pei, et al., "Putting Routing Tables in Silicon," IEEE Network Magazine, Jan. 1992, pp. 42–50.

Perkins, D., "Requiements for an Internet Standard Point-to-Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–contiguous Wildcarding," Abstract, Bellcore.

Chowdhury, et al. "Alternative Bandwith Allocation", 1992, IEEE Infocom '92, pp. 1061–1068.

Zhang, et al. "Rate–Controlled Static–Priority Queueing", 1993, IEEE, pp. 227–236.

IBM, "Method and Apparatus for the Statistical Multiplexing of Voice, Data, and Image Signals", Nov., 1992, IBM Technical Data Bulletin n6 Nov. 1992, pp. 409–411.

* cited by examiner

END-TO-END BIDIRECTIONAL KEEP-ALIVE USING VIRTUAL CIRCUITS

BACKGROUND OF THE INVENTION

1. Field of the Invention

This invention relates to end-to-end bidirectional keep-alive techniques using virtual circuits.

2. Description of Related Art

In frame relay networks and some other networking techniques, communication between nodes uses virtual circuits, either permanent virtual circuits (PVCs) or switched virtual circuits (SVCs)

One problem which has arisen in the art is determining whether particular virtual circuits are still operational, or have failed due to one or more communication links in the virtual circuit having failed. Frame relay networks usually include a local management interface (LMI), a management technique for local communication links between nodes and the network. However, information provided by the LMI is limited to the communication links directly between routers and the frame relay network, and does not generally allow nodes to determine if a virtual circuit with a remote node has failed at an intermediate communication link in the frame relay network. Moreover, information provided by the LMI is sometimes unreliable with regard to status of remote links to the frame relay network.

Another problem which has arisen in the art is that of determining congestion for virtual circuits for which communication is primarily unidirectional. For example, multicast video sessions includes a great deal of data which is originated at a single source and transmitted to essentially passive receivers. In frame relay networks, header information in frames provides information regarding congestion within the frame relay network. However, passive receivers generate frames at most infrequently, and thus have little or no opportunity to cause information regarding congestion to be transmitted back to the source in a multicast video session.

Known methods exist, at higher-level protocol layers, for responding to broken or congested network communication, including virtual circuits. However, these known methods operate at higher-level protocol layers, such as an application (level 3) protocol layer in the OSI protocol layer model, and thus can take substantially more time and more resources to respond to a broken virtual circuit than may be desirable, particularly for band-width-intensive applications such as multicast video.

Known methods exist for management of aggregates of virtual circuits. For example, one such method is described in Annex D of specification document T1.617, in Annex A of the specification document ITU Q.933, and in the LMI frame relay specification document. However, this method is operative only for aggregates of virtual circuits, and is not effective for determining if an individual virtual circuit is broken, congested, or otherwise requires remedial action at an intermediate point in the frame relay network.

Accordingly, it would be advantageous to provide techniques for determining whether particular virtual circuits are end-to-end operational, as well as techniques for determining information regarding congestion at nodes which generate infrequent frames. These advantages are achieved by a method and system according to the present invention in which a virtual circuit protocol provides for end-to-end bidirectional keep-alive messages using virtual circuits.

SUMMARY OF THE INVENTION

The invention provides a method and system for sending and receiving end-to-end bidirectional keep-alive messages using virtual circuits. Nodes coupled to a network, such as a frame relay network, periodically exchange data link-layer "keep-alive" messages which indicate information regarding configuration and status of the virtual circuit, as well as information regarding congestion at sending nodes. Nodes respond to received keep-alive messages, or to timed-out failure to receive keep-alive messages, with follow-on actions, such as attempting to reconnect when a virtual circuit fails. Keep-alive messages can be propagated across multiple networks of either similar or different architecture.

In a preferred embodiment, keep-alive messages include sent and received sequence numbers, thus providing receiving nodes with a technique for determining if any keep-alive messages have been lost. Keep-alive messages can also include information regarding configuration of the virtual circuit and congestion at the sending node.

DESCRIPTION OF THE PREFERRED EMBODIMENT

In the following description, a preferred embodiment of the invention is described with regard to preferred process steps, data structures, and protocols. Those skilled in the art would recognize, after perusal of this application, that embodiments of the invention may be implemented using a computer at each site operating under program control, and that modification of a set of computers to implement the process steps, data structures, and protocols described herein would not require undue invention.

System Including End-to-end Keep-alive Messages

Figure 1:
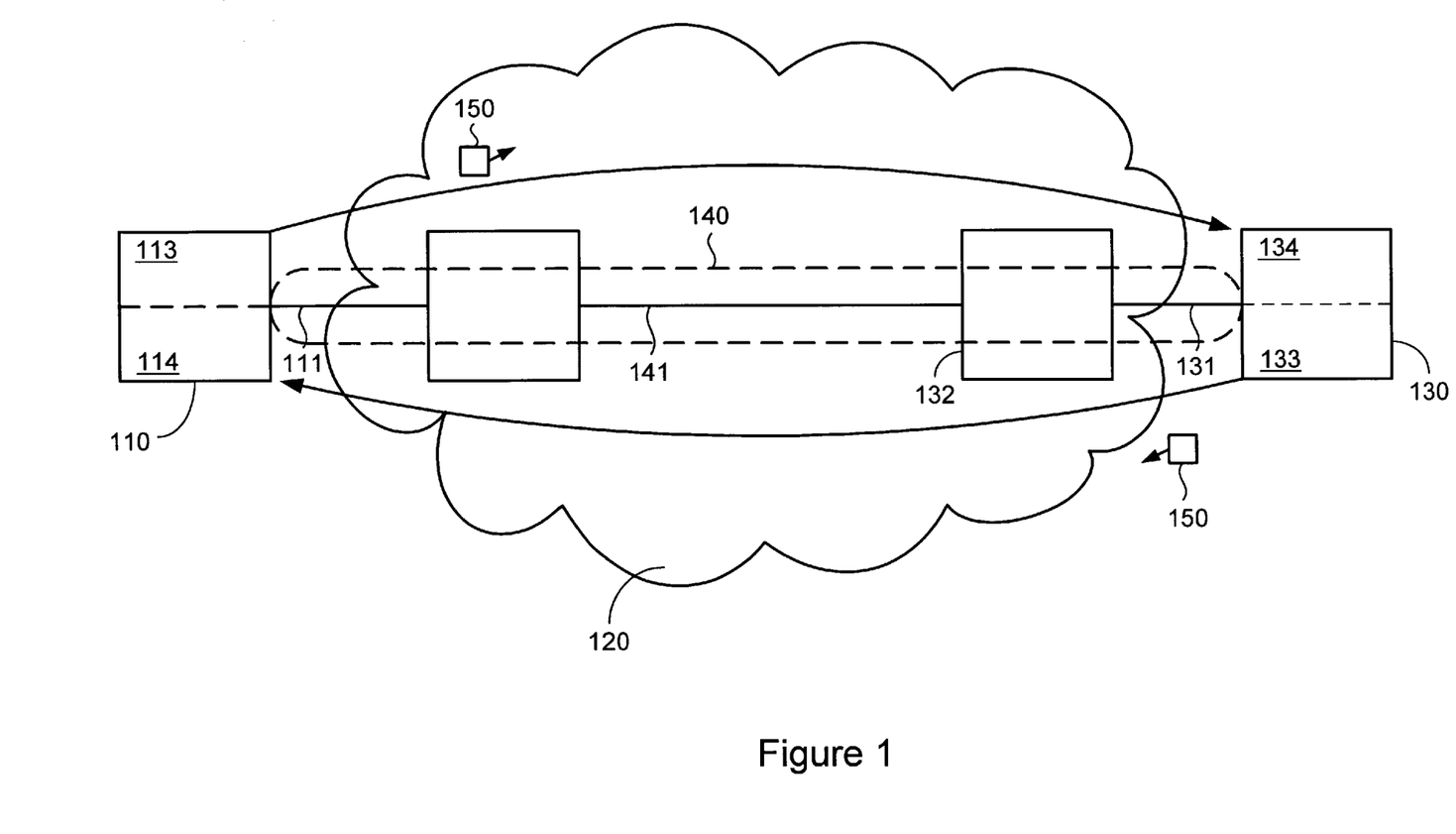
FIG. 1 shows a block diagram of a system including end-to-end keep-alive messages.

FIG. 1 shows a block diagram of a system including end-to-end keep-alive messages.

A first node 110 is coupled using a first local communication link 111 to a first local router 112 in a frame relay network 120. Similarly, a second node 130 is coupled using a second local communication link 131 to a second local router 132 in the frame relay network 120. Communication between the first node 110 and the second node 130 is conducted using a virtual circuit 140, including the first local communication link 111, the second local communication link 131, and a communication path 141 in the frame relay network 120.

The first local communication link 111 is controlled using a first local management interface (LMI) 161 between the first node 110 and the first local router 112. Similarly, the second local communication link 131 is controlled using a second local management interface (LMI) 163 between the second node 130 and the second local router 132. Communication occurs in the frame relay network 120 using a set of communication links (not shown) between the first local router 112 and the second local router 132; note that the first local router 112 and the second local router 1132 may happen to be the same device, or may be coupled by a large number of separate devices and separate communication links.

When the virtual circuit 140 is established in the frame relay network 120 between the first node 110 and the second node 130, it is assigned an associated unique data link connection identifier (DLCI). Frames which are transmitted using the frame relay network 120 include a header; the header includes the DLCI, thus identifying frames being transmitted using the associated virtual circuit 140.

The first node 110 includes a keep-alive send side 113, disposed for sending keep-alive messages 150 to the second node 130; the second node 130 includes a corresponding keep-alive receive side 134, disposed for receiving keep-alive messages 150 from the first node 110. Similarly, the second node 130 includes a keep-alive send side 133, disposed for sending keep-alive messages 150 to the first node 110; the first node 110 includes a corresponding keep-alive receive side 114, disposed for receiving keep-alive messages 150 from the second node 130.

Protocol for Using End-to-end Keep-alive Messages

Figure 2:
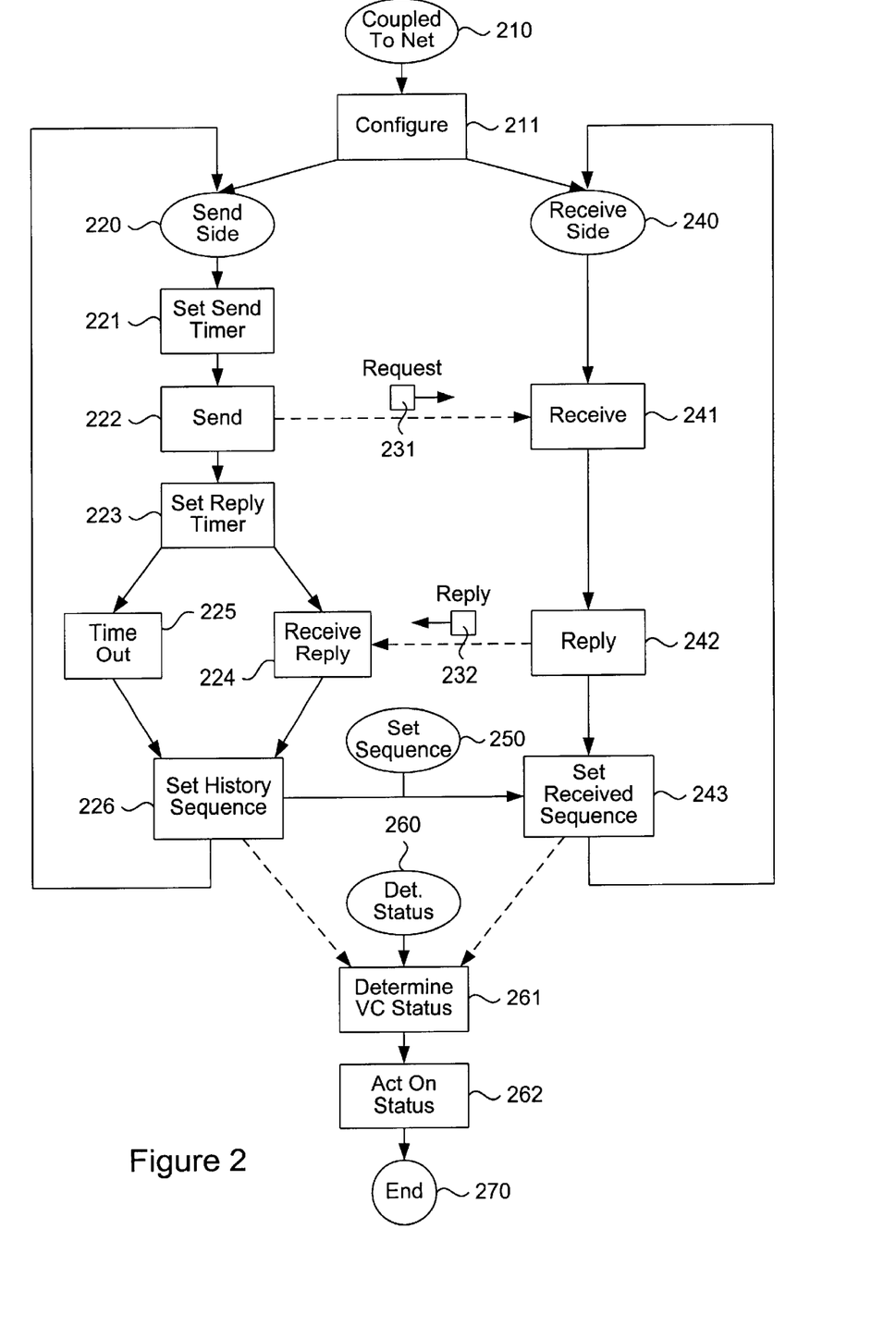
FIG. 2 shows a flowchart of a protocol for using end-to-end keep-alive messages.

FIG. 2 shows a flowchart of a protocol for using end-to-end keep-alive messages.

A method 200 for using end-to-end keep-alive messages includes a sequence of steps to be executed by the first node 110 in cooperation with the second node 130.

At a flow point 210, the first node 110 and the second node 130 have each been coupled to the frame relay network 120.

At a step 211, the first node 110 and the second node 130 are configured for the end-to-end keep-alive technique. As part of this step, the first node 110 and the second node 130 are configured to assign values to a set of timeout intervals. A first timeout interval determines a duration to be waited by the keep-alive send side 113 or the keep-alive send side 133 before sending a keep-alive REQUEST message 231. A second timeout interval determines a duration to be waited by the keep-alive send side 113 or the keep-alive send side 133 before triggering a timeout for the keep-alive REPLY message 232.

In a preferred embodiment, the first timeout interval and the second timeout interval have the same duration.

In a preferred embodiment, the first timeout interval and the second timeout interval are preselected by an operator at the first node 110 when the first node 110 is coupled to the frame relay network 120. Similarly, the first timeout interval and the second timeout interval are preselected by an operator at the second node 130 when the second node 130 is coupled to the frame relay network 120. In a preferred embodiment, the first timeout interval is about 10 seconds, and the second timeout interval is about 15 seconds.

At a flow point 220, the first node 110 and the second node 130 have been coupled using a virtual circuit 140, and the keep-alive send side 113 or the keep-alive send side 133 are disposed for activity.

At a step 221, the keep-alive send side 113 at the first node 110 sets its REQUEST timer to the first timeout interval. Similarly, the keep-alive send side 133 at the second node 130 sets its own REQUEST timer to the first timeout interval.

At a step 222, a timeout occurs for the first timeout interval at the keep-alive send side 113 at the first node 110. The keep-alive send side 113 generates a keep-alive REQUEST message 231 and transmits the keep-alive REQUEST message 231 to the keep-alive receive side 134 at the second node 130. Similarly, a timeout occurs for the first timeout interval at the keep-alive send side 133 at the second node 130. The keep-alive send side 133 at the second node 130 generates its own keep-alive REQUEST message 231 and transmits its keep-alive REQUEST message 231 to the keep-alive receive side 114 at the first node 110. In each case, the keep-alive REQUEST message 231 includes a keep-alive send sequence-number (SSN). In each case, the keep-alive REQUEST message 231 is transmitted on the same virtual circuit 140 identified by the associated DLCI.

At a step 223, the keep-alive send side 113 at the first node 110 sets its REPLY timer to the second timeout interval. Similarly, the keep-alive send side 133 at the second node 130 sets its own REPLY timer to the second timeout interval.

At a flow point 240, the first node 110 and the second node 130 have been coupled using a virtual circuit 140, and the keep-alive receive side 114 or the keep-alive receive side 134 are disposed for activity.

At a step 241, the keep-alive receive side 134 at the second node 130 receives the keep-alive REQUEST message 231 from the keep-alive send side 113 at the first node 110. Similarly, the keep-alive receive side 114 at the first node 110 receives its keep-alive REQUEST message 231 from the keep-alive send side 133 at the second node 130.

At a step 242, the keep-alive receive side 134 at the second node 130 generates a keep-alive REPLY message 232 and transmits the keep-alive REPLY message 232 to the keep-alive send side 113 at the first node 110. Similarly, the keep-alive receive side 114 at the first node 110 generates its own keep-alive REPLY message 232 and transmits its keep-alive REPLY message 232 to the keep-alive send side 133 at the second node 130. In each case, the keep-alive REPLY message 232 includes a keep-alive receive sequence-number (RSN). In each case, the keep-alive REPLY message 232 is transmitted on the virtual circuit 140 identified by the selected DLCI used by the keep-alive REQUEST message 231.

In a preferred embodiment, the keep-alive send sequence-number (SSN) and the keep-alive receive sequence-number (RSN) are both sent with both the keep-alive REQUEST message 231 and the keep-alive REPLY message 232.

After the step 223, if the keep-alive send side 113 at the first node 110 receives the keep-alive REPLY message 232 within the second timeout interval, it proceeds with the step 224. Otherwise, a timeout occurs for the second timeout interval at the keep-alive send side 113 at the first node 110, and it proceeds with the step 225. Similarly, if the keep-alive send side 133 at the second node 130 receives its keep-alive REPLY message 232 within the second timeout interval, it proceeds with the step 224. Otherwise, a timeout occurs for the second timeout interval at the keep-alive send side 133 at the second node 130, and it proceeds with the step 225.

At the step 224, the keep-alive send side 113 at the first node 110 receives the keep-alive REPLY message 232, and the keep-alive send side 113 at the first node 110 proceeds with the step 226. Similarly, the keep-alive send side 133 at the second node 130 receives its keep-alive REPLY message 232, and the keep-alive send side 133 at the second node 130 proceeds with the step 226.

At the step 225, a timeout occurs for the second timeout interval at the keep-alive send side 113 at the first node 110, and the keep-alive send side 113 at the first node 110 proceeds with the step 226. Similarly, a timeout occurs for the second timeout interval at the keep-alive send side 133 at the second node 130, and the keep-alive send side 133 at the second node 130 proceeds with the step 226.

At the step 226, the keep-alive send side 113 at the first node 110 determines whether the keep-alive REQUEST message 231 and keep-alive REPLY message 232 exchange was a SUCCESS or a FAILURE, and sets a current "keep-alive send event" accordingly. Similarly, the keep-alive send side 133 at the second node 130 determines whether the keep-alive REQUEST message 231 and keep-alive REPLY message 232 exchange was a SUCCESS or a FAILURE, and sets its current "keep-alive send event" accordingly.

The exchange was a SUCCESS if the keep-alive send side 113 at the first node 110 executed the step 224 and the SSN and RSN matched expectations, and a FAILURE if the keep-alive send side 113 at the first node 110 executed the step 225 or if the SSN or RSN failed to match expectations. To match expectations, the SSN in the keep-alive REQUEST message 231 must match the SSN returned by the keep-alive REPLY message 232, and the RSN in the keep-alive REPLY message 232 must be one greater than the RSN in the keep-alive REQUEST message 231. If the exchange was a FAILURE, the RSN is set to match the RSN returned by the keep-alive REPLY message 232.

At the step 243, the keep-alive receive side 134 at the second node 130 sets a current "keep-alive receive event" responsive to the keep-alive REQUEST message 231, and whether the SSN and RSN matched expectations. Similarly, the keep-alive receive side 114 at the first node 110 sets its current "keep-alive receive event" responsive to its own keep-alive REQUEST message 231, and whether the SSN and RSN matched expectations. To match expectations, the RSN in the keep-alive REQUEST message 231 must match the RSN returned by the most recent keep-alive REPLY message 232, and the SSN in the keep-alive REQUEST message 231 must be one greater than the SSN returned by the most recent keep-alive REPLY message 232. If the exchange was a FAILURE, the SSN is set to match the SSN received in the keep-alive REQUEST message 231.

At a flow point 250, not part of normal operation of the method 200 but available for extraordinary processing, an operator (not shown) is prepared to enter a command to set the history sequence for the keep-alive send side 113 or the keep-alive receive side 114 (or the keep-alive send side 133 or the keep-alive receive side 134). In a preferred embodiment, the operator may comprise a person using a console at the first node 110 or the second node 130, or may comprise an application program operating at the first node 110 or the second node 130 or coupled to the first node 110 or the second node 130 using the network 120 or another communication path.

At the step 226, the keep-alive send side 113 at the first node 110 sets a history sequence of keep-alive send events, responsive to a command from the operator. Similarly, the keep-alive send side 133 at the second node 130 sets its history sequence of keep-alive send events responsive to the command from the operator. If history sequences of keep-alive send events have never been set, they default to hexadecimal "FFFFFFFF", representing a sequence of 32 "SUCCESS" keep-alive send events.

After the step 226, the keep-alive send side 113 at the first node 110 continues at the flow point 220. Similarly, after the step 226, the keep-alive send side 133 at the second node 130 also continues at the flow point 220.

At the step 243, the keep-alive receive side 134 at the second node 130 sets a history sequence of keep-alive receive events, responsive to the command from the operator. Similarly, the keep-alive receive side 114 at the first node 110 sets its history sequence of keep-alive receive events responsive to the command from the operator. If history sequences of keep-alive receive events have never been set, they default to hexadecimal "FFFFFFFF", representing a sequence of 32 "SUCCESS" keep-alive receive events.

After the step 243, the keep-alive receive side 134 at the second node 130 continues at the flow point 240. Similarly, after the step 243, the keep-alive receive side 114 at the first node 130 also continues at the flow point 240.

At a flow point 260, the first node 110 or the second node 130 are disposed for determining a status of the virtual circuit 140.

At a step 261, the first node 110 determines the status of the virtual circuit responsive to the history sequence for the keep-alive send side 113, responsive to the history sequence for the keep-alive receive side 114, and responsive to a status for the LMI interface for the first local communication link 111. Similarly, the second node 130 determines the status of the virtual circuit responsive to the history sequence for the keep-alive send side 133, responsive to the history sequence for the keep-alive receive side 134, and responsive to a status for the LMI interface for the second local communication link 131.

The keep-alive send history sequence is constructed responsive to a prior keep-alive send history sequence (as possibly recorded at the step 226) and a current keep-alive send event (as determined at the step 224 or the step 225). The prior keep-alive send history sequence is shifted left one bit, and the current keep-alive send event is appended at the least significant bit. This operation would be described in the "C" computer language as shown in equation 262.

$$\text{new\_history} = (\text{old\_history} << 1) | \text{current\_event} \quad (262)$$

Similarly, the keep-alive receive history sequence is constructed responsive to a prior keep-alive receive history sequence (as possibly recorded at the step 243) and a current keep-alive receive status (as determined at the step 242). The prior keep-alive receive history sequence is shifted left one bit, and the current keep-alive receive status is appended at the least significant bit.

The keep-alive send side 113 at the first node 110 maintains 32 bits of send history sequence information, and the keep-alive receive side 114 at the first node 110 maintains 32 bits of receive history sequence information. Similarly, the keep-alive send side 133 at the second node 130 maintains 32 bits of send history sequence information, and the keep-alive receive side 134 at the second node 130 maintains 32 bits of receive history sequence information.

The keep-alive send side 113 at the first node 110 uses the send history sequence information to determine a send status for the virtual circuit 140; it determines that the virtual circuit 140 is "up" if there have been fewer than ES errors in the past MS messages; values for ES and MS are configurable parameters which can be set by commands from the operator. In a preferred embodiment, ES is about 2 and MS is about 3. Similarly, the keep-alive send side 133 at the second node 130 uses its send history sequence information to determine its send status for the virtual circuit 140.

The keep-alive receive side 134 at the second node 130 uses the receive history sequence information to determine a receive status for the virtual circuit 140; it determines that the virtual circuit 140 is "up" if there have been fewer than ER errors in the past MR messages; values for ER and MR are configurable parameters which can be set by commands from the operator. In a preferred embodiment, ER is about 2 and MR is about 3. Similarly, the keep-alive receive side 114 at the first node 110 uses its receive history sequence information to determine its receive status for the virtual circuit 140.

In a preferred embodiment, the first node 110 and the second node 130 determine the status of the virtual circuit as shown in table 2-1.

TABLE 2-1

| receive status | send status | LMI status | overall status |
| --- | --- | --- | --- |
| up | up | up | up |
| down | any | any | down |
| any | down | any | down |
| any | any | down | down |

At a step 262, the status as determined in the step 261 is reported to a level 3 protocol layer. The first node 110 or the second node 130 can act on the status as specified by the level 3 protocol layer; alternatively, the first node 110 or the second node 130 can use the status as determined in the step 261 within the frame relay protocol layer. For example, in a preferred embodiment, the first node 110 or the second node 130 can switch the virtual circuit 140 to a new virtual circuit 140 responsive to status showing that the virtual circuit 140 is inoperative.

At a flow point 270, the method 200 is complete, and the first node 110 and the second node 130 can proceed with other processing.

Content of End-to-end Keep-alive messages

Figure 3:
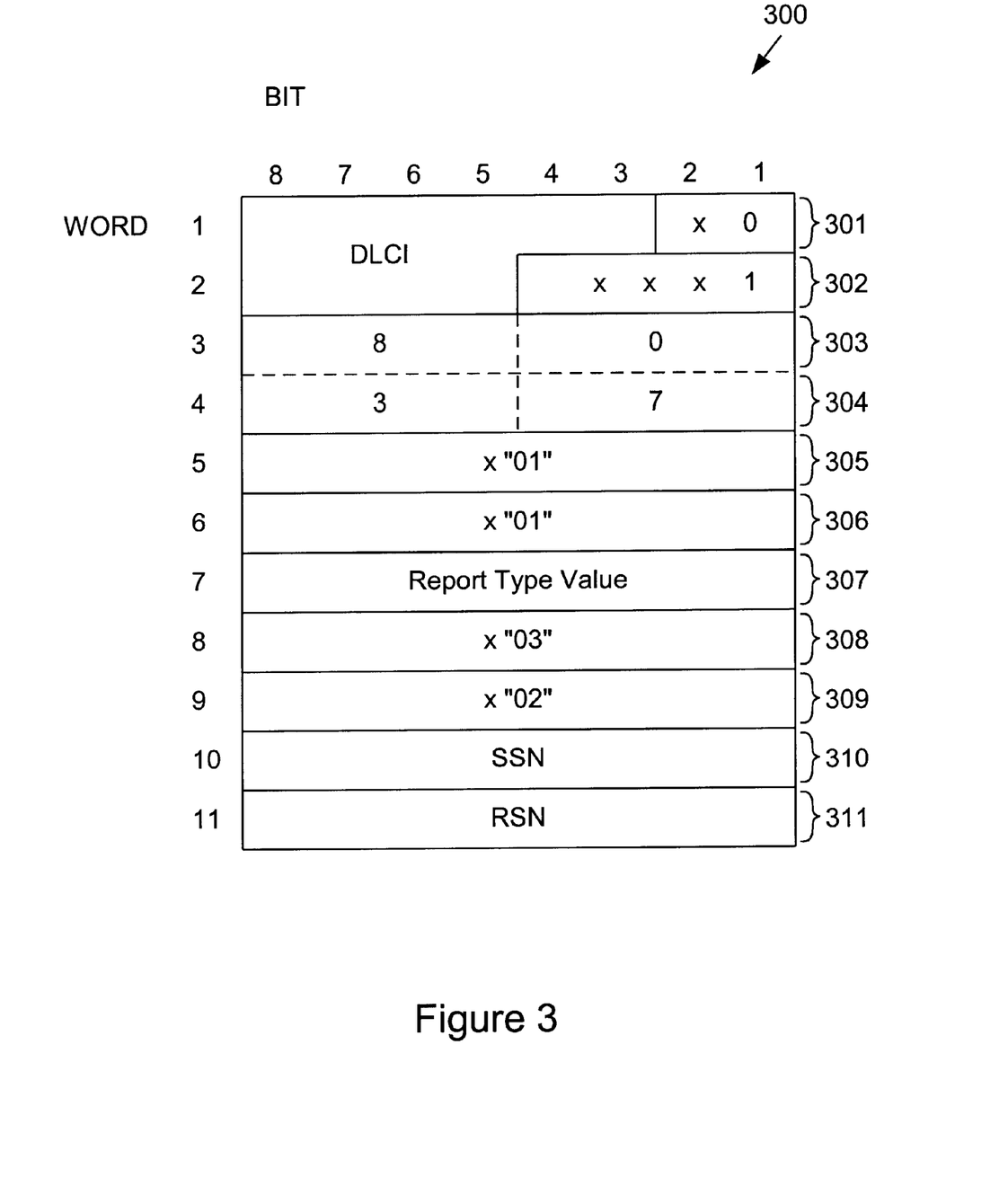
FIG. 3 shows a block diagram of an end-to-end keep-alive message in a frame relay network.

FIG. 3 shows a block diagram of an end-to-end keep-alive message in a frame relay network.

An end-to-end keep-alive message comprises a format 300 having a sequence of eight-bit bytes; in the figure, bits in these bytes are labeled from a least significant bit 1 to a most significant bit 8. In a preferred embodiment, the keep-alive REQUEST message 231 and the keep-alive REPLY message 232 have the same format.

The format 300 begins with four bytes of frame-relay header information. A first byte 301 and a second byte 302 collectively comprise a two-byte frame-relay header having a ten-bit DLCI and six bits of control information. Frame-relay headers are known in the art of frame-relay network processing. A third byte 303 and a fourth byte 304 collectively comprise a two-byte type field value reserved for end-to-end keep-alive messages, which is hexadecimal "8037", thus indicating that the frame-relay message is an end-to-end keep-alive message. The hexadecimal value "8037" is arbitrarily selected and can be any value so long as it is used consistently and does not interfere with values selected for other types of frame-relay messages.

The format 300 continues with three bytes of keep-alive report-type information. A fifth byte 305 comprises a keep-alive report type identifier, which is hexadecimal "01". A sixth byte 306 comprises a keep-alive report type length field, which is hexadecimal "01", to indicate a one-byte report type value. A seventh byte 307 comprises a keep-alive report type value, which distinguishes between a keep-alive REQUEST message 231 and a keep-alive REPLY message 232. In a preferred embodiment, the value hexadecimal "01" indicates a keep-alive REQUEST message 231 and the value hexadecimal "02" indicates a keep-alive REPLY message 232.

The format 300 continues with four bytes of keep-alive sequence-number information. An eighth byte 308 comprises a keep-alive sequence-number identifier, which is hexadecimal "03". A ninth byte 309 comprises a keep-alive sequence-number length field, which is hexadecimal "02", to indicate a two-byte sequence-number value. A tenth byte 310 comprises the value for the keep-alive send sequence-number (SSN) and an eleventh byte 311 comprises the value for the keep-alive receive sequence-number (RSN). Both the keep-alive send sequence-number (SSN) and the keep-alive receive sequence-number (RSN) are represented as modulo-255 unsigned integers.

Keep-alive messages can also include information regarding configuration of the virtual circuit and congestion at the sending node. For example, certain applications, such as compression or voice transmission, might require consistent configuration at both the sending and receiving ends of the virtual circuit 140.

ALTERNATIVE EMBODIMENTS

Although preferred embodiments are disclosed herein, many variations are possible which remain within the concept, scope, and spirit of the invention, and these variations would become clear to those skilled in the art after perusal of this application.

We claim:

1. A system for providing keep-alive detection between end nodes of a virtual circuit in a data network, the system comprising:

said virtual circuit including a first end node, a second end node and at least one intermediate router;

said first end node being coupled to a first router of said at least one intermediate router;

said second end node being coupled to a second router of said at least one intermediate router, said second end node further being coupled to said first end node via said virtual circuit;

said virtual circuit being represented by an associated data link connection identifier (DLCI) other than that used by a local management interface, and configured to allow transmission of data frames between said first and second end nodes;

said first end node including a first keep-alive mechanism configured to send at least one data link-layer keep-alive REQUEST message to said second end node via said virtual circuit;

said second end node including a second keep-alive mechanism configured to respond to reception of said at least one keep-alive REQUEST message by sending at least one data link-layer keep-alive REPLY message to said first end node via said virtual circuit; and wherein said first end node is configured to take action to alter connectivity of the virtual circuit in response to a failure to receive said at least one keep-alive REPLY message within a timeout period.

2. The system of claim 1 wherein said data network is a frame relay network, and wherein first end node is configured to transmit said at least one keep-alive REQUEST message over said virtual circuit using a frame format that is compatible with data frames being transmitted over the virtual circuit represented by the selected data link connection identifier (DLCI).

3. A system as in claim 1, wherein said at least one keep-alive REQUEST message and said at least one keep-alive REPLY message comprise data link-level protocol messages.

4. A system as in claim 1, wherein said at least one keep-alive REPLY message includes information regarding configuration of said virtual circuit.

5. A system as in claim 1, wherein said at least one keep-alive REPLY message includes information regarding status of said virtual circuit.

6. A system as in claim 1, wherein said at least one keep-alive REQUEST message includes information regarding congestion in said frame relay network at said first node.

7. A system as in claim 1, wherein said at least one keep-alive REQUEST message and said at least one keep-alive REPLY message include sent and received sequence numbers.

8. A system as in claim 1, wherein said response includes attempting to reconnect said virtual circuit.

9. A system as in claim 2, wherein said second end node is coupled to said frame relay network using a second network.

10. A system as in claim 9, wherein said second network is a frame relay network.

11. A system as in claim 9, wherein said second network is other than a frame relay network.

12. A system as in claim 1, wherein said at least one keep-alive REQUEST message and said at least one keep-alive REPLY message are each configured to be transmitted as frames according to a frame relay protocol; and wherein said at least one keep-alive REQUEST message and said at least one keep-alive REPLY message each include a respective field having a predetermined value which may be used for identifying the frame as a keep-alive message.

13. A method for providing keep-alive detection between end nodes of a virtual circuit in a data network, the method comprising:

sending, via the virtual circuit, at least one data link-layer keep-alive REQUEST message from a first end node to a second end node of the virtual circuit, said first end node including a keep-alive mechanism for detecting a failure of communication with said second end node, said virtual circuit being identified by an associated data link connection identifier (DLCI) other than that used by a local management interface, and configured to allow transmission of data frames between said first and second end nodes;

waiting for receipt of a data link-layer keep-alive REPLY message from said second end node via said virtual circuit; and taking action to alter connectivity of said virtual circuit in response to a failure to receive said at least one keep-alive REPLY message within a predetermined timeout period.

14. The method of claim 13 wherein said sending includes sending a plurality of keep-alive REQUEST message to said second end node at predetermined intervals.

15. The method of claim 13, further comprising:

receiving at said second end node, via said virtual circuit, said at least one keep-alive REQUEST message; and responding to said at least one keep-alive REQUEST message by sending at least one data link-layer keep-alive REPLY message over said virtual circuit to said first end node.

16. The method of claim 13 wherein the data network is a frame relay network.

17. A method for providing keep-alive detection between end nodes of a virtual circuit in a data network, the method comprising:

receiving at a keep-alive mechanism of a second end node, a plurality of data link-layer keep-alive REQUEST messages, at least one of said keep-alive REQUEST messages being sent from a first end node via said virtual circuit, said at least one keep-alive REQUEST message being used by the first node to detect a failure of communication with the second end node, said virtual circuit being identified by an associated data link connection identifier (DLCI) other than that used by a local management interface, and configured to allow transmission of data frames between said first and second end nodes; and responding to each received keep-alive REQUEST message by sending a respective data link-layer keep-alive REPLY message to said first end node over said virtual circuit.

18. The method of claim 17, further comprising:

sending, via said virtual circuit, each of said plurality of said at least one keep-alive REQUEST messages from a first keep-alive mechanism at said first node;

waiting for said at least one keep-alive REPLY messages at said first keep-alive mechanism; and taking action to alter connectivity of said virtual circuit in response to a failure to receive a keep-alive REPLY message within a selected timeout period.

19. The method of claim 17 wherein said data network is a frame relay network.

20. A computer program product for providing keep-alive detection between end nodes of a virtual circuit in a data network, the computer program product comprising:

a computer readable medium comprising:

computer code for sending, via the virtual circuit, at least one data link-layer keep-alive REQUEST message from a first end node to a second end node of the virtual circuit, said first end node including a keep-alive mechanism for detecting a failure of communication with said second end node, said virtual circuit being identified by an associated data link connection identifier (DLCI) other than that used by a local management interface, and configured to allow transmission of data frames between said first and second end nodes;

computer code for waiting for receipt of a data link-layer keep-alive REPLY message from said second end node via said virtual circuit; and computer code for taking action to alter connectivity of said virtual circuit in response to a failure to receive said at least one keep-alive REPLY message within a predetermined timeout period.

21. The computer program product of claim 20 wherein said sending code includes computer code for sending a plurality of keep-alive REQUEST message to said second end node at predetermined intervals.

22. The computer program product of claim 20, further comprising:

computer code for receiving at said second end node, via said virtual circuit, said at least one keep-alive REQUEST message; and computer code for responding to said at least one keep-alive REQUEST message by sending at least one data link-layer keep-alive REPLY message over said virtual circuit to said first end node.

23. The computer program product of claim 20 wherein the data network is a frame relay network.

24. A system for providing keep-alive detection between end nodes of a virtual circuit in a data network, the system comprising:

means for sending, via the virtual circuit, at least one data link-layer keep-alive REQUEST message from a first end node to a second end node of the virtual circuit, said first end node including a keep-alive mechanism for detecting a failure of communication with said second end node, said virtual circuit being identified by an associated data link connection identifier (DLCI) other than that used by a local management interface, and configured to allow transmission of data frames between said first and second end nodes;

means for waiting for receipt of a data link-layer keep-alive REPLY message from said second end node via said virtual circuit; and means for taking action to alter connectivity of said virtual circuit in response to a failure to receive said at least one keep-alive REPLY message within a predetermined timeout period.

25. A method for providing keep-alive detection between end nodes of a virtual circuit in a data network, the method comprising:

sending, via said virtual circuit, a data link-layer keep-alive REQUEST message from a first keep-alive mechanism disposed at a first end node of the virtual circuit, said at least one keep-alive REQUEST message being addressed to a second end node of the virtual circuit, said virtual circuit being identified by an associated data link connection identifier (DLCI) other than that used by a local management interface, and configured to allow transmission of data frames between said first and second end nodes;

receiving said at least one keep-alive REQUEST message at a second keep-alive mechanism disposed at said second end node;

responding to said at least one keep-alive REQUEST message by sending at least one data link-layer keep-alive REPLY message to said first end node via said virtual circuit;

waiting for said at least one keep-alive REPLY message at said first end node; and taking action to alter connectivity of said virtual circuit in response to a failure to receive said at least one keep-alive REPLY message within a timeout period.

26. A method as in claim 25, wherein said taking action includes attempting to reconnect said virtual circuit.

27. An end node coupled to one or more routers which are part of a virtual circuit of a frame relay network, said end node including:

a keep-alive mechanism including:
a send mechanism configured to send at least one data link-layer keep-alive REQUEST message over the virtual circuit, said virtual circuit being represented by an associated data link connection identifier (DLCI) other than that used by a local management interface, and configured to allow transmission of data frames between end nodes of the virtual circuit;

a reply receive mechanism configured to receive, via said virtual circuit, a data link-layer keep-alive REPLY message, responsive to said at least one keep-alive REQUEST message; and a timeout mechanism configured to initiate at least one action in response to a failure to receive said at least one keep-alive REPLY message at the reply receive mechanism within a timeout period.

28. The node of claim 27, wherein the virtual circuit connects the end node to a second end node, said second end node including:

a keep-alive receive mechanism in communication with said send mechanism via said virtual circuit, said at least one keep-alive receive mechanism including:
a request receive mechanism configured to receive said at least one keep-alive REQUEST message from the first end node; and
a send reply mechanism configured to send said at least one keep-alive REPLY message responsive to the request receive mechanism.

29. The node of claim 28, wherein said second end node includes a second keep-alive mechanism.

30. The node of claim 27, wherein said at least one keep-alive mechanism further comprises a receive mechanism in communication with a second keep-alive mechanism of a second end node via a second virtual circuit represented by a second DLCI, said receive mechanism including:

a request receive mechanism configured to receive said at least one keep-alive REQUEST message from said second node; and a send reply mechanism configured to send said at least one keep-alive REPLY message to the request receive mechanism in response to receiving said at least one keep-alive REQUEST message.

31. The node of claim 27, wherein said at least one keep-alive REQUEST message and said at least one keep-alive REPLY message comprise link-level protocol messages.

* * * * *